(12) United States Patent
Vasiev et al.

(10) Patent No.: US 12,485,227 B1
(45) Date of Patent: Dec. 2, 2025

(54) HOLD ASSISTANCE DEVICE FOR USE WITH A MEDICAMENT DELIVERY DEVICE

(71) Applicant: Genzyme Corporation, Cambridge, MA (US)

(72) Inventors: Iskandar Vasiev, Melbourn (GB); Adam Christopher Nightingale, Cambourne (GB); Tom Alan Oakley, Cambridge (GB); Haiming Wu, Cambridge, MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/984,934

(22) Filed: Dec. 17, 2024

(51) Int. Cl.
*A61M 5/31* (2006.01)
*A61M 5/315* (2006.01)
*A61M 5/24* (2006.01)

(52) U.S. Cl.
CPC . *A61M 5/31513* (2013.01); *A61M 2005/2403* (2013.01)

(58) Field of Classification Search
CPC ........ A61M 5/20; A61M 5/32; A61M 5/3271; A61M 5/326; A61M 5/3243; A61M 5/3202; A61M 5/3269; A61M 2005/2026; A61M 2005/3247; A61M 2005/3267; A61M 2005/3217; A61M 2205/586; A61M 39/22; A61M 39/24; F15B 1/021
See application file for complete search history.

(56) References Cited

U.S. PATENT DOCUMENTS

| | | | | |
|---|---|---|---|---|
| 4,827,973 A | * | 5/1989 | Boehmer | F16K 15/141 137/854 |
| 2010/0305507 A1 | * | 12/2010 | Duncan | A61M 5/1456 604/121 |
| 2013/0066278 A1 | * | 3/2013 | Holland | A61M 5/204 604/207 |
| 2017/0165429 A1 | * | 6/2017 | Holmqvist | A61M 5/326 |

OTHER PUBLICATIONS

Needle-based injection systems for medical use requirements and test methods, Part 1: Needle injection systems, ISO 11608 1:2014(E), Third Edition, Switzerland, ISO, Dec. 15, 2014, pp. 1-13.

* cited by examiner

*Primary Examiner* — Kevin C Sirmons
*Assistant Examiner* — Antarius S Daniel
(74) *Attorney, Agent, or Firm* — Fish & Richardson P.C.

(57) ABSTRACT

A hold assistance device for use with a medicament delivery device is described. The hold assistance device includes: a housing configured to be coupled to a medicament delivery device; a chamber for containing air, the chamber having a proximal end and a distal end; and a piston movable within the chamber between the proximal and distal ends of the chamber, wherein the piston is arrangeable in an activated position inside the chamber in which the piston is arranged proximate to the proximal end of the chamber such that the chamber is at least partially evacuated of air and movement of the piston towards the distal end of the chamber is resisted by a vacuum force.

18 Claims, 6 Drawing Sheets

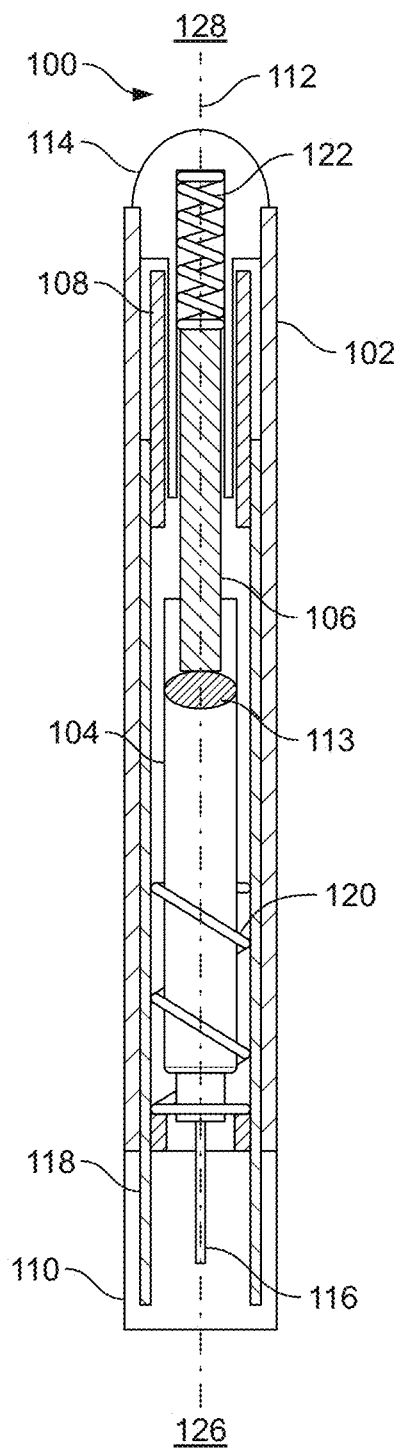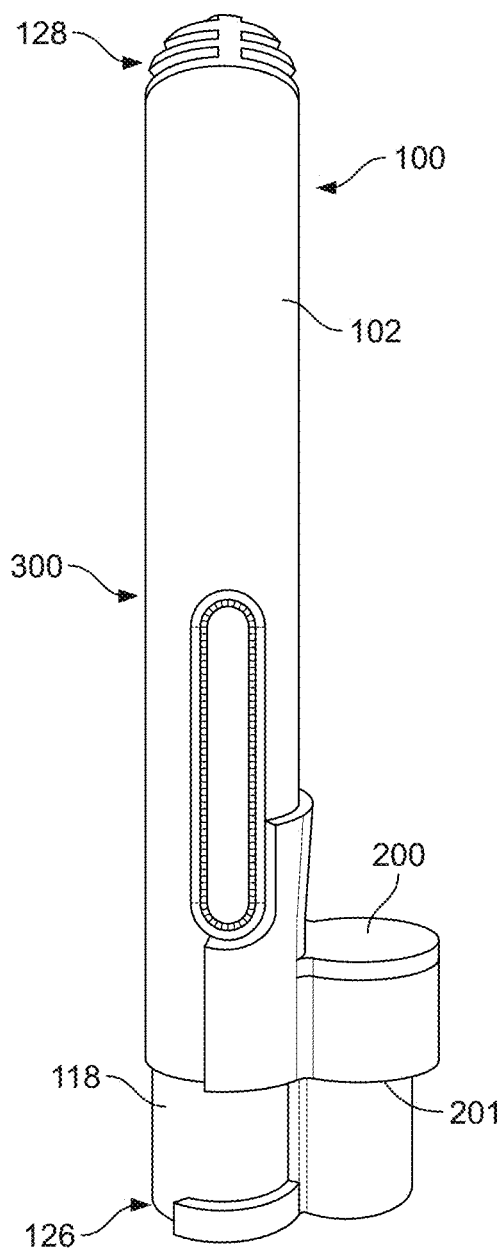
FIG. 1
FIG. 2

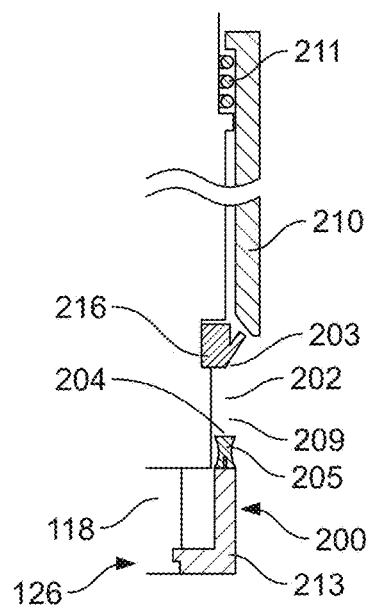 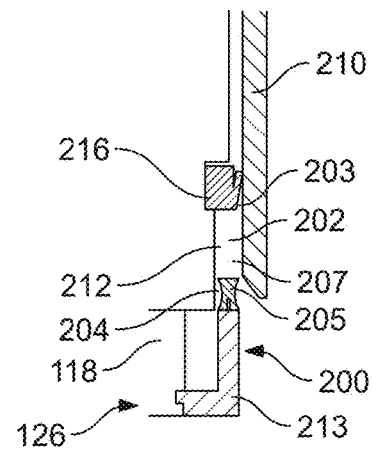 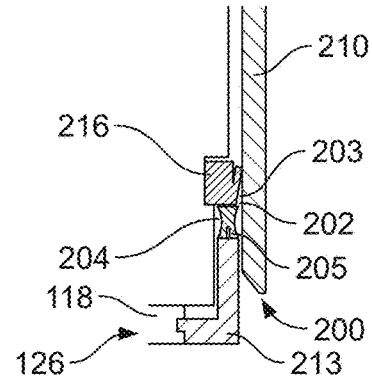
FIG. 7A  FIG. 7B  FIG. 7C
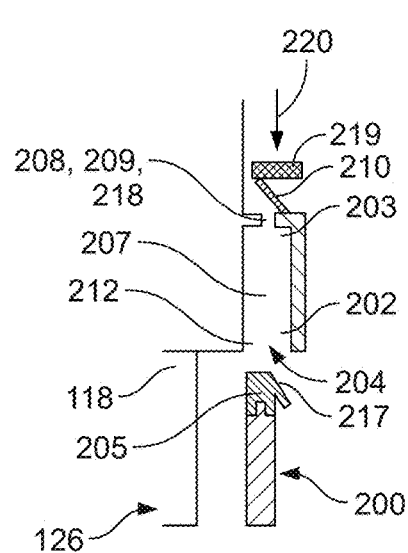 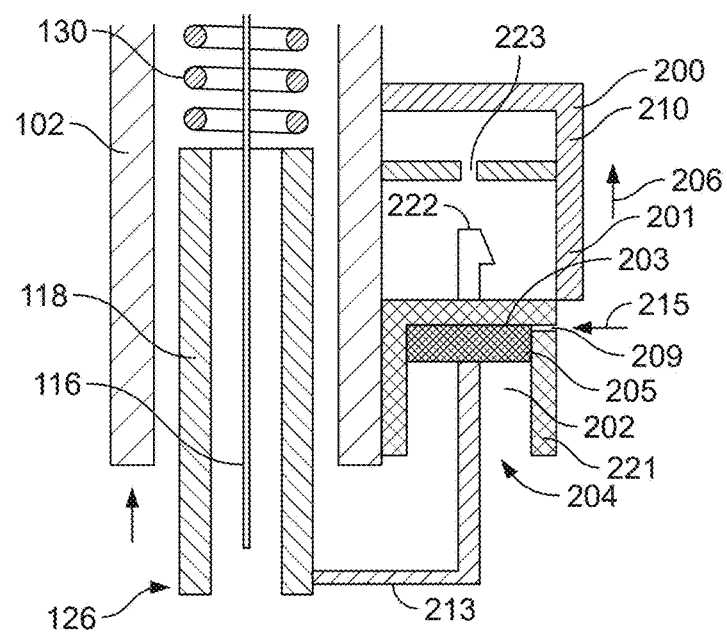
FIG. 8  FIG. 9

HOLD ASSISTANCE DEVICE FOR USE WITH A MEDICAMENT DELIVERY DEVICE

TECHNICAL FIELD

The present disclosure relates to a hold assistance device for use with a medicament delivery device; to a medicament delivery system comprising a hold assistance device and a medicament delivery device; and to a method of operating a medicament delivery system.

BACKGROUND

Medicament delivery devices can be used to deliver a range of medicaments. In some devices, the device must be held in a holding position at an injection site to ensure that the correct dose of medicament is dispensed from the device, before removing the device from the injection site. It may be difficult to hold the device in the holding position whilst the medicament is dispensed. This may result in pain, discomfort, a wet injection site, early device removal and/or partial delivery of the medicament. Administering an injection involves several risks and challenges, encompassing both mental and physical aspects.

SUMMARY

The present disclosure provides a hold assistance device to assist a user with the holding of a medicament delivery device in the holding position whilst the medicament is dispensed.

A first aspect of this disclosure provides a hold assistance device for use with a medicament delivery device, the hold assistance device comprising: a housing configured to be coupled to a medicament delivery device; a chamber for containing air, the chamber having a proximal end and a distal end; and a piston movable within the chamber between the proximal and distal ends of the chamber; wherein the piston is arrangeable in an activated position inside the chamber in which the piston is arranged proximate to the proximal end of the chamber such that the chamber is at least partially evacuated of air and movement of the piston towards the distal end of the chamber is resisted by a vacuum force.

Optionally, the hold assistance device is configured to be coupled to a medicament delivery device having one or more of the features as recited below in relation to the second aspect of this disclosure.

Optionally, the piston is configured to be coupled to a movable element of a medicament delivery device.

Optionally, the piston is configured to be coupled to an axially movable needle cover of a medicament delivery device, such that when the piston is coupled to the needle cover, axial movement of the needle cover relative to a main body of the medicament device causes axial movement of the piston relative to the chamber.

Optionally, the housing is configured to be coupled to a main body of a medicament delivery device, wherein the needle cover of the medicament delivery device is configured to be axially movable relative to the main body.

Optionally, the hold assistance device is configured to be coupled to a medicament delivery device comprising: a main body configured to receive a medicament cartridge and comprising a proximal end and a distal end; a needle for delivery of medicament from the medicament cartridge; a needle cover axially movable relative to the main body between: an extended position in which the needle cover extends from the distal end of the main body and covers a distal end of the needle which protrudes from the main body; and a retracted position in which the needle cover is arranged in a proximal position relative to the extended position such that the distal end of the needle protrudes from a distal end of the needle cover; and a needle cover biasing member configured to bias the needle cover axially in the distal direction towards the extended position.

Optionally, the housing of the hold assistance device is configured to be coupled to the main body of the medicament delivery device, and the piston is configured to be coupled to the needle cover, such that when the piston is coupled to the needle cover, axial movement of the needle cover relative to the main body causes axial movement of the piston relative to the housing.

Optionally, the piston is configured to be axially movable inside the chamber along an axial direction.

Optionally, the axial direction is defined by the proximal and distal ends of the chamber, such that the piston is configured to be move inside the chamber along a linear direction between the proximal and distal ends of the chamber.

Optionally, the axial position of the piston inside the chamber determines a volume of a free volume inside the chamber which can contain air.

Optionally, the piston is configured to move in a generally upwards direction from the distal end of the chamber to the proximal end of the chamber, and the piston is configured to move in a generally downwards direction from the proximal end of the chamber to the distal end of the chamber. Optionally, the piston moves in an upward stroke in the generally upwards direction, and in a downward stroke in the generally downwards direction.

Optionally, the piston is configured to move in a generally upward stroke to move from the distal end of the chamber into the activated position.

Optionally, the housing defines the chamber.

Optionally, the chamber is configured to receive the piston.

Optionally, the vacuum force is configured to act generally in a direction away from the distal end of the chamber and towards the proximal end of the chamber.

Optionally, the piston is arrangeable in an open position inside the chamber in which the piston is arranged proximate to the distal end of the chamber such that the chamber is configured to contain a volume of air.

Optionally, when the piston is arranged in the open position, the piston is arranged at a maximum displacement from the proximal end of the chamber, and a free volume in the chamber for containing air is at a maximum volume.

Optionally, when the piston is arranged in the activated position, the piston is arranged at a maximum displacement from the distal end of the chamber, and a free volume in the chamber for containing air is at a minimum volume.

Optionally, when the piston is arranged in the activated position, the piston is arranged at a maximum displacement from the distal end of the chamber, and a free volume in the chamber for containing air is substantially zero.

Optionally, when the piston is arranged in the activated position, the piston is arranged to be substantially in contact with the proximal end of the chamber.

Optionally, when the piston is arranged in the activated position, the chamber is substantially fully evacuated of air.

Optionally, the chamber comprises an outlet configured to permit the flow of air out of the chamber, wherein movement of the piston from the open position to the activated position causes at least a portion of the volume of air contained within the chamber to be expelled out from the chamber via the outlet.

Optionally, movement of the piston from the open position to the activated position causes substantially all of the volume of air contained within the chamber to be expelled out from the chamber via the outlet.

Optionally, the outlet comprises a one-way valve configured to permit the flow of air out of the chamber and to not permit the flow of air into the chamber.

Optionally, movement of the piston away from the distal end of the chamber and towards the proximal end of the chamber causes at least a portion of a volume of air contained within the chamber when the piston is arranged proximal to the distal end of the chamber to be evacuated from the chamber, to provide the vacuum force when the piston is in the activated position.

Optionally, movement of the piston away from the distal end of the chamber and towards the proximal end of the chamber causes substantially all of the volume of air contained within the chamber when the piston is arranged proximal to the distal end of the chamber to be evacuated from the chamber, to provide the vacuum force when the piston is in the activated position.

Optionally, the housing comprises the outlet.

Optionally, the outlet is formed in an upper surface of the housing at the proximal end of the chamber.

Optionally, the hold assistance device further comprises an air inlet flow path for the flow of air into the chamber.

Optionally, when the piston is in the activated position, the air inlet flow path is configured to be sealed, blocked or otherwise obstructed, to prevent the flow of air into the chamber, to maintain the vacuum force.

Optionally, the air inlet flow path can be selectively unsealed, unblocked or otherwise unobstructed, to permit the flow of air into the chamber, to reduce the magnitude of the vacuum force, after the piston has been arranged in the activated position.

Optionally, the chamber comprises an inlet for the flow of air into the chamber, wherein the inlet is sealable such that when the piston is in the activated position and the inlet is sealed air is prevented from flowing into the chamber, to maintain the vacuum force.

Optionally, the inlet is configured to be selectively unsealed, such that when the piston is in the activated position and the inlet is unsealed air is permitted to flow into the chamber causing the vacuum force to be reduced in magnitude to permit movement of the piston towards the distal end of the chamber.

Optionally, the hold assistance device further comprises a sealing member slidable relative to the chamber, wherein when the piston is in the activated position, the sealing member is arrangeable relative to the chamber in: a first position in which the sealing member obstructs the inlet such that the inlet is sealed, and a second position in which the inlet is at least partially unobstructed by the sealing member such that the inlet is not sealed and air is permitted to flow into the chamber.

Optionally, the hold assistance device further comprises a sealing member slidable relative to the inlet, wherein when the piston is in the activated position, the sealing member is arrangeable relative to the inlet in: a first position in which the sealing member obstructs the inlet such that the inlet is sealed, and a second position in which the inlet is at least partially unobstructed by the sealing member such that the inlet is not sealed and air is permitted to flow into the chamber.

Optionally, the hold assistance device further comprises a sealing member biasing member configured to bias the sealing member axially in the distal direction towards the first position of the sealing member.

Optionally, the hold assistance device further comprises a sealing member biasing member configured to bias the sealing member towards the first position of the sealing member.

Optionally, the hold assistance device further comprises a sealing member biasing member configured to bias the sealing member towards the second position of the sealing member.

Optionally, the sealing member biasing member comprises one or more springs.

Optionally, each of the one or more springs is an extension spring.

Optionally, each of the one or more springs is a compression spring.

Optionally, upon placement of the piston into the activated position, the inlet is configured to be sealed.

Optionally, upon placement of the piston into the activated position, the sealing member is configured to obstruct the inlet such that the inlet is sealed.

Optionally, upon placement of the piston into the activated position, the sealing member becomes movable such that the inlet becomes unsealable.

Optionally, the sealing member is initially arranged in the first position when the piston is placed into the activated position, and the sealing member can subsequently be moved into the second position after the piston has been placed into the activated position.

Optionally, the sealing member comprises a sleeve.

Optionally, the sleeve is arranged to circumscribe at least a portion of the housing and/or at least a portion of the chamber.

Optionally, the sleeve comprises a generally cylindrical portion.

Optionally, the sleeve is configured to be axially movable relative to the chamber.

Optionally, when the sleeve is arranged in the first position the sleeve is arranged closer to the distal end of the chamber than when the sleeve is arranged in the second position.

Optionally, the sleeve is configured to move in a direction away from the distal end of the chamber and towards the proximal end of the chamber to move the sleeve from the first position to the second position.

Optionally, when the sleeve is arranged in the first position the sleeve is arranged closer to the proximal end of the chamber than when the sleeve is arranged in the second position.

Optionally, the sleeve is configured to move in a direction away from the proximal end of the chamber and towards the distal end of the chamber to move the sleeve from the first position to the second position.

Optionally, the sealing member comprises a shroud.

Optionally, the shroud is arranged to circumscribe at least a portion of the housing and/or at least a portion of the chamber.

Optionally, the shroud comprises a generally cylindrical portion.

Optionally, the shroud is configured to be axially movable relative to the chamber.

Optionally, the sealing member comprises a push pad.

Optionally, the push pad is arranged to circumscribe at least a portion of the housing and/or at least a portion of the chamber.

Optionally, the push pad is generally cylindrical.

Optionally, the push pad is configured to be axially movable relative to the chamber.

Optionally, the push pad is configured to be pushed in a direction away from the proximal end of the chamber and towards the distal end of the chamber to move the push pad from the second position to the first position.

Optionally, the sealing member comprises a flap, an elastic element, a pivotable element, and/or a deformable element, arranged to selectively block the inlet.

Optionally, the inlet is configured to be selectively sealed by placing the inlet against the skin of a user or a patient of the hold assistance device, and to be selectively unsealed by moving the skin of the user or the patient relative to the inlet.

Optionally, the hold assistance device further comprises an actuation member configured to be moved to move the sealing member between the first and second positions of the sealing member.

Optionally, the actuation member is configured to apply an actuation force to the sealing member to cause the sealing member to obstruct the inlet.

Optionally, the piston comprises one or more suction cups configured to adhere to the proximal end of the chamber when the piston is in the activated position, such that adherence of the one or more suction cups to the chamber provides the vacuum force and prevents the flow of air into the chamber.

Optionally, the piston comprises a cup seal or a lip seal configured to adhere to the proximal end of the chamber when the piston is in the activated position, such that adherence of the cup seal or lip seal to the chamber provides the vacuum force and prevents the flow of air into the chamber.

Optionally, the piston comprises a piston arm and a piston head.

Optionally, the piston head comprises a cup seal for forming a suction connection with the proximal end of the chamber when the piston is in the activated position.

Optionally, the piston is generally annular.

Optionally, the piston has a thickness of approximately 2 mm.

Optionally, the piston is arranged to circumscribe the housing.

Optionally, the chamber is generally annular.

Optionally, the hold assistance device comprises a seal, for example a lip seal, configured to interface with the piston.

Optionally, the seal is arranged at a proximal end of the chamber and is configured to interface with the piston when the piston is in the activated position.

Optionally, the piston is slidable inside the chamber such that a free volume for receiving air inside the chamber is greater when the piston is arranged proximate to the distal end of the chamber than when the piston is arranged proximate to the proximal end of the chamber.

Optionally, the hold assistance device further comprises a chamber body defining the chamber, the chamber body comprising the proximal and distal ends of the chamber.

Optionally, the chamber body is configured to be received by the housing.

Optionally, the chamber body is configured to be axially movable relative to the housing inside the housing.

Optionally, the chamber body is configured to receive the piston.

Optionally, the piston is configured to be axially moveable relative to the chamber body inside the chamber body.

Optionally, the chamber body comprises the inlet.

Optionally, the inlet is formed in a side wall of the chamber body.

Optionally, the housing comprises a receiving element, for example an aperture, groove or recess, for receiving a coupling member configured to couple the chamber body to the housing.

Optionally, the coupling member is fixedly coupled to the chamber body.

Optionally, the coupling member is integrally formed with the chamber body.

Optionally, the coupling member is configured to form a snap fit with the receiving element of the housing.

Optionally, the coupling member comprises a clip.

Optionally, the coupling member and the chamber body are configured to be moved in a proximal direction to couple the coupling member to the receiving element of the housing.

Optionally, the chamber body and the piston are arrangeable in an activated position inside the housing in which the chamber body and the piston are arranged proximate to or towards a proximal end of the housing.

Optionally, the piston is configured to be in the activated position in the chamber when the coupling member and the chamber body are moved in a proximal direction to couple the coupling member to the receiving element of the housing.

Optionally, the piston and the chamber are configured to be assembled in a pre-evacuated state, such that the piston is in the activated position inside the chamber before the coupling member and the chamber body are coupled to the receiving element of the housing.

Optionally, the hold assistance device comprises one or more chambers for containing air, each of the chambers having a respective proximal end and a respective distal end.

Optionally, the hold assistance device comprises one or more pistons, each of the pistons movable within a respective one of the one or more chambers, between the respective proximal and distal ends of the respective chamber.

Optionally, each of the one or more pistons is arrangeable in an activated position inside its respective chamber, such that when the piston is in the activated position, the respective chamber is at least partially evacuated of air and movement of the piston towards the distal end of the chamber is resisted by a vacuum force.

Optionally, the hold assistance device comprises two chambers and two pistons.

Optionally, a first chamber and a first piston are arranged to be diametrically opposed to a second chamber and a second piston relative to the housing.

Optionally, a first chamber and a first piston are arranged opposite to a second chamber and a second piston about the housing.

Optionally, a plurality of chambers and a plurality of respective pistons are arranged to be circumferentially spaced apart from one another about the hold assistance device.

Optionally, the one or more pistons have a combined total surface area of between approximately 60 $mm^2$ and 360 $mm^2$, for example equal to at least approximately 120 $mm^2$, for example equal to at least approximately 150 $mm^2$.

Optionally, the hold assistance device is generally C-shaped or U-shaped and comprises a recess, groove or channel for receiving a medicament delivery device.

Optionally, the hold assistance device comprises a casing configured to circumscribe the piston and the chamber.

Optionally, the casing is configured to circumscribe the housing.

Optionally, the casing is configured to circumscribe the sealing member.

Optionally, the casing is integrally formed with the housing.

Optionally, the casing is coupled to and/or integrally formed with the piston.

Optionally, the casing comprises a flexible joint and a clamshell cover for closing the casing.

Optionally, the casing comprises a clasp configured to lock the clamshell cover in a closed position.

Optionally, the hold assistance device further comprises a reservoir configured to be filled with air when the piston is moved into the activated position, wherein the reservoir is configured to emit a signal, such as a sound, for a fixed duration, commencing upon movement of the piston into the activated position.

Optionally, the reservoir is configured to send an audible indication, for example a whistling sound, which is configured to stop after a desired amount of time, for example which is configured to stop in time with the delivery of a medicament being complete.

A second aspect of this disclosure provides a medicament delivery system comprising the hold assistance device of the first aspect of this disclosure, and a medicament delivery device. The medicament delivery device comprises: a main body configured to receive a medicament cartridge and comprising a proximal end and a distal end; a needle for delivery of medicament from the medicament cartridge; a needle cover axially movable relative to the main body between: an extended position in which the needle cover extends from the distal end of the main body and covers a distal end of the needle which protrudes from the main body; and a retracted position in which the needle cover is arranged in a proximal position relative to the extended position such that the distal end of the needle protrudes from a distal end of the needle cover; and a needle cover biasing member configured to bias the needle cover axially in the distal direction towards the extended position. The housing of the hold assistance device is configured to be coupled to the main body, and the piston is configured to be coupled to the needle cover, such that when the piston is coupled to the needle cover, axial movement of the needle cover relative to the main body causes axial movement of the piston relative to the housing.

Optionally, the hold assistance device comprises one or more of the optional features recited above in relation to the first aspect of this disclosure.

Optionally, the housing and the main body are configured to remain fixed relative to one another.

Optionally, the proximal end of the main body is arranged to be proximate to the proximal end of the chamber, and the distal end of the main body is arranged to be proximate to the distal end of the chamber.

Optionally, the distal end of the needle is arranged to be proximate to the distal end of the main body.

Optionally, the distal end of the needle is arranged to be proximate to the distal end of the chamber.

Optionally, when the needle cover is in the extended position the needle cover is arranged closer to the distal end of the main body than when the needle cover is in the retracted position.

Optionally, the needle cover is configured to be slidably received by the main body.

Optionally, the needle cover is arranged to be retracted inside the main body when the needle cover is in the retracted position.

Optionally, the needle cover and the main body are arranged to be concentric with one another.

Optionally, the hold assistance device and the medicament delivery device are configured to fit together.

Optionally, the medicament delivery device is configured to be received by the hold assistance device.

Optionally, at least a portion of the medicament delivery device is configured to be circumscribed by the hold assistance device.

Optionally, the hold assistance device is configured to be removable from the medicament delivery device.

Optionally, the hold assistance device comprises a clamshell mechanism for removably attaching the hold assistance device to the medicament delivery device.

Optionally, the needle cover biasing member is configured to apply a biasing force to bias the needle cover axially in the distal direction towards the extended position.

Optionally, the vacuum force is configured to act generally in an opposite direction to a biasing force of the needle cover biasing member, such that when the piston is in the activated position, the hold assistance device is configured to bias the needle cover axially in the proximal direction towards the retracted position.

Optionally, the piston comprises a surface area. The surface area may be orientated to be generally normal to an axial direction of the medicament delivery system comprising the proximal ends and the distal ends of the main body and the chamber.

Optionally, the piston comprises a surface area of between approximately 60 mm$^2$ and 360 mm$^2$, for example approximately 120 mm$^2$, for example approximately 150 mm$^2$.

Optionally, the magnitude of the biasing force is between approximately 5 N and 30 N, for example between approximately 10 N and 15 N, for example approximately 12 N.

Optionally, the magnitude of the vacuum force is greater than or equal to the magnitude of the biasing force.

Optionally, the magnitude of the vacuum force is at least approximately twice the magnitude of the biasing force, for example approximately three, four, five, six, seven, eight, nine, ten or more times greater than the biasing force.

Optionally, the needle cover biasing member comprises one or more springs.

Optionally, the needle cover biasing member comprises a compression spring.

Optionally, when the needle cover is in the extended position, the one or more springs of the needle cover biasing member are each configured to be in a natural state, and when the needle cover is in the retracted position, the one or more springs of the needle biasing member are each configured to be in a stressed state.

Optionally, the natural state is an uncompressed state and the stressed state is a compressed state.

Optionally, when the piston is in an open position in which the piston is arranged at a maximum possible displacement from the proximal end of the chamber such that the piston is arranged proximate to the distal end of the chamber, the needle cover is in the extended position.

Optionally, when the piston is in the open position the needle cover biasing member is in its natural unbiased state. For example, the needle cover biasing member may comprise a compression spring which is in a natural uncompressed state when the piston is in the open position.

Optionally, the hold assistance device further comprises a sealing member biasing member configured to bias the sealing member axially in the distal direction towards the first position of the sealing member.

Optionally, the sealing member biasing member comprises one or more springs.

Optionally, each of the one or more springs is an extension spring.

Optionally, the sealing member biasing member is configured to bias the sealing member towards the first position of the sealing member.

Optionally, the sealing member biasing member is configured to provide a second biasing force, the second biasing force configured to act on the sealing member.

Optionally, the second biasing force is smaller in magnitude than the biasing force of the needle cover biasing member.

Optionally, the medicament delivery system further comprises a connection member configured to couple the needle cover to the piston.

Optionally, the connection member comprises an arm.

Optionally, the connection member is generally annular.

Optionally, the connection member is integrally formed with the piston.

Optionally, the connection member is configured to be mechanically received by the needle cover.

Optionally, the connection member is removably couplable to the needle cover.

Optionally, the connection member is integrally formed with the needle cover.

Optionally, the housing comprises one or more protrusions for being received in one or more corresponding apertures, recesses, channels or grooves of the main body, to fixedly couple the housing to the main body.

Optionally, the housing comprises one or more apertures, recesses, channels or grooves configured to receive one or more corresponding protrusions of the main body, to fixedly couple the housing to the main body.

Optionally, the hold assistance device comprises a connection member for coupling the piston to the needle cover.

Optionally, the hold assistance device comprises two pistons, and two connection members defined by two respective flanges, for coupling the pistons to the needle cover.

Optionally, the needle cover comprises one or more apertures, recesses, channels or grooves for receiving the flanges.

Optionally, the needle cover comprises one or more apertures, recesses, channels or grooves for receiving the connection member.

Optionally, the hold assistance device comprises a casing comprising a flexible joint and a clamshell cover for closing the casing.

Optionally, the casing comprises a clasp configured to lock the clamshell cover in a closed position around the medicament delivery device.

Optionally, the clamshell cover is configured to close the hold assistance device around the main body and the needle cover of the medicament delivery device.

Optionally, the casing is configured to be coupled to the needle sleeve and is axially movable relative to the housing and to the main body.

Optionally, the medicament delivery system further comprises a medicament cartridge containing medicament.

A third aspect of this disclosure provides a method of operating a medicament delivery system as in the second aspect of this disclosure, the method comprising: arranging the piston of the hold assistance device in the activated position; axially moving the needle cover relative to the main body from the extended position to the retracted position; and unsealing an inlet to the chamber to permit air to flow into the chamber, such that the magnitude of the vacuum force is reduced, thus permitting the piston to move from the activated position to a position proximate to the distal end of the chamber, and such that the needle cover correspondingly moves from the retracted position towards the extended position.

Optionally, the step of axially moving the needle cover relative to the main body from the extended position to the retracted position causes the piston to be moved into the activated position, such that when the needle cover is in the retracted position the piston is in the activated position, and such that when the needle cover is in the extended position the piston is not in the activated position.

Optionally, the step of arranging the piston of the hold assistance device in the activated position, and axially moving the needle cover relative to the main body from the extended position to the retracted position, occur simultaneously.

Optionally, the step of unsealing the inlet to the chamber to permit air to flow into the chamber comprises a user of the medicament delivery system moving a sealing member to selectively uncover or unblock and thus unseal the inlet.

Optionally, the movement of the sealing member is actuated manually by the user moving the sealing member after a medicament has been delivered to a patient.

Optionally, the movement of the sealing member is actuated automatically by the user removing the medicament delivery device from an injection site of a patient and/or by reducing the magnitude of a hold force or pressure applied thereto, for example under the action of a sealing member biasing member.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Embodiments will now be described, by way of example only, with reference to the accompanying drawings, in which:

FIG. 1 shows a cross-sectional schematic view of a medicament delivery device;

FIG. 2 shows a medicament delivery system;

FIG. 7A shows a cross-sectional schematic view of a medicament delivery system;

FIG. 7B shows a cross-sectional schematic view of a medicament delivery system;

FIG. 7C shows a cross-sectional schematic view of a medicament delivery system;

FIG. 8 shows a cross-sectional schematic view of a medicament delivery system;

FIG. 9 shows a cross-sectional schematic view of a medicament delivery system;

DETAILED DESCRIPTION

Figure 3A:
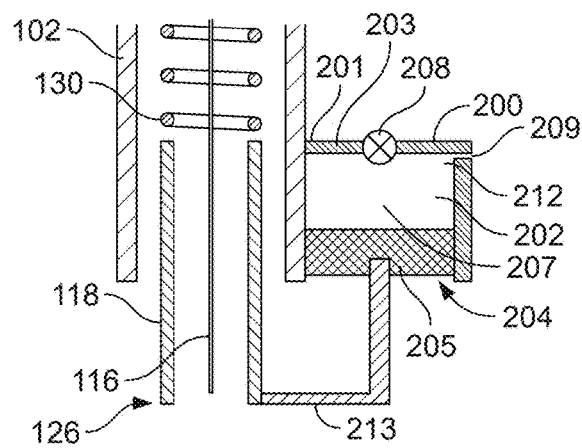
FIG. 3A shows a cross-sectional schematic view of a medicament delivery system.

A drug delivery device (also referred to as an injection device), as described herein, may be configured to inject a medicament into a subject such as a human or animal. For example, a delivery of the medicament could be sub-cutaneous, intra-muscular, or intravenous. Such a device could be operated by a user, who may or may not be the subject. In examples where the user is not the subject, the user may be a caregiver such as a nurse or physician. The device can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a subject's skin for a period of time (e.g., about 5, 15, 30, 60, or 120 minutes) to deliver a "large" volume of medicament (e.g., about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors, for example, a drug ranging in viscosity from about 3 cP to about 50 cP. Consequently, a drug delivery device will often include a hollow needle ranging from about 25 to about 31 Gauge in size. Common sizes are 27 and 29 Gauge.

The delivery devices described herein can also include one or more automated functions. For example, one or more of a needle insertion, a medicament injection, or a needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device. The one or more automated functions of an auto-injector may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

Auto-injectors require user actions to commence medicament delivery. One of these actions may involve a user placing a needle cover (also referred to as a needle shroud or needle sleeve) against an injection site of a subject and applying an axial force to the device to cause the needle cover to retract into the housing of the device. As the needle cover retracts into the housing, the needle of the device extends beyond the needle cover and penetrates the injection site of the subject (e.g. the subject's skin). Medicament delivery may be automatically initiated in response to the retraction of the needle cover or in response to another action by the user, for example the user pressing a button on the device. Once medicament delivery has been initiated, a medicament delivery mechanism will cause medicament contained within the device to be injected into the subject via the needle. The user should hold the device steady with respect to the injection site during the course of medicament delivery to ensure the needle remains steady within the subject. This is to minimise pain and/or discomfort for the subject, and to prevent a wet injection site, an early device removal and/or a partial medicament delivery.

After the device is removed from injection site, many autoinjectors cover the needle with the needle cover/needle shroud, which is extended out of the device by a control spring. During activation of the device and while holding the device steady during medicament delivery, the user must counteract the biasing force applied by the control spring to the needle cover. However, some users such as those with impaired dexterity may find it difficult to hold the device steady for a relatively long period of time during medicament delivery. It may be beneficial to provide a device which is easier to handle during medicament delivery. However, simply reducing the biasing force produced by the control spring to the needle cover risks accidental actuation and needle safety issues. Therefore, it is desirable to provide a means to help a user of the device hold the device steady, by reducing the force needed to be applied by the user to overcome the biasing force. It is also desirable to reduce the user hold force, whilst minimising or removing any effect on the inserted needle depth, which can impact on the pharmacokinetic profile of the injected medicament and which does not require, or requires very minimal, casework modifications to the injection device.

FIG. 1 shows a schematic example of a cross section of a medicament delivery device 100 (hereinafter referred to as an injection device) according to one or more aspects of the present disclosure. The injection device 100 is configured to inject a medicament into a subject. The injection device 100 comprises an outer casing 102 (also referred to as a housing or injection device body) that encloses a reservoir 104, a plunger 106 and a rotatable collar 108. The reservoir 104 typically contains the medicament to be injected, and may, for example, be in the form of a syringe. The injection device 100 can also include a cap assembly 110 that can be detachably mounted to the outer casing 102. A user typically removes the cap 110 from the outer casing 102 before device 100 is operated.

As shown, the outer casing 102 is substantially cylindrical and has a substantially constant diameter along the longitudinal axis of the device 100. The injection device 100 has a distal region 126 and a proximal region 128. The term "distal" refers to a location that is relatively closer to a site of injection, and the term "proximal" refers to a location that is relatively further away from the injection site.

The outer casing 102 is closed at a proximal end by a rear casing 114. A needle 116 and a retractable needle cover 118 (also referred to as a "needle sleeve" or "needle cover") extend from a distal end of the outer casing 102. The retractable needle cover 118 is biased axially in the distal direction of the injection device 100, for example using a control spring 120. The needle cover 118 is coupled to the outer casing 102 to permit axial movement of needle cover 118 relative to the outer casing 102. For example, the cover 118 can move in a longitudinal direction parallel to longitudinal axis 112. Specifically, movement of cover 118 in a proximal direction relative to the outer casing 102 can cause a needle 116 to extend from distal region of the outer casing 102, and outside a distal end of the cover 118.

The plunger 106 is biased towards the distal end of the injection device 100 by a biasing means, for example comprising a drive spring 122. The plunger 106 is retained in an initial position by a combination of the rear casing 114 and the collar 108, preventing the biasing means from displacing the plunger 106 in the distal direction. Activation of the injection device 100 causes the collar 108 to rotate, which releases the plunger 106. Once released, the biasing means causes the plunger 106 to move in the distal direction (i.e., towards the needle 116 end of the injection device 100). The plunger 106 contacts a stopper 113 in the reservoir 104, displacing the stopper 113 in the distal direction and causing medicament stored in the reservoir 104 to be expelled from the injection device 100 via the needle 116.

Activation of the injection device 100 can occur via several mechanisms. For example, the needle 116 may be fixedly located relative to the outer casing 102 and initially be located within an extended needle cover 118. Proximal movement of the needle cover 118 by placing a distal end of the cover 118 against an injection site of the subject and moving the outer casing 102 in a distal direction will uncover the distal end of the needle 116. Such relative movement allows the distal end of the needle 116 to extend into the injection site. Such insertion is termed "manual" insertion as the needle 116 is manually inserted via the user's manual movement of the outer casing 102 relative to cover 118. Retraction of the cover 118 into the outer casing 102 causes the collar 108 to rotate, releasing the plunger 106.

Another form of activation is "automated", whereby the needle 116 moves relative to outer casing 102. Such insertion can be triggered by movement of the cover 118 and/or by another form of activation such as an user actuation of a button (not shown) of the injection device 100.

The user presses the needle cover 118 against an injection site to push the needle cover 118 at least partially into the outer casing 102. The exposed needle 116 is pushed into the injection site of the subject. In a holding position, medicament is automatically dispensed from the needle 116 via an automated mechanism. A user typically holds the needle cover 118 in the holding position for a predetermined period of time, to ensure that the correct dose of medicament is dispensed from the device 100, before removing the device 100 from the injection site.

The spring biasing force from the control spring 120 against which the user applies a force to move the needle cover 118 is one component of an "activation force" of the device 100. The activation force refers to the force or force profile that the user exerts on the device 100 to move the needle cover 118 from the extended position shown in FIG. 1 to a retracted position within the outer casing 102 for medicament delivery. If this force or force profile is not well balanced, it can lead to difficulty in activating the device 100 for some users, or increase the pain or anxiety associated with using the device 100.

Following the injection, the needle 116 can be retracted within the cover 118. Retraction can occur when the cover 118 moves distally under the biasing of the control spring 120 as a user removes the device 100 from the injection site of the subject. Once a distal end of the cover 118 has moved past a distal end of the needle 116 such that the needle 116 is covered, the cover 118 may be locked in its extended position to prevent any (substantial) proximal movement of the cover 118 relative to the outer casing 102 (i.e., preventing any movement of the cover 118 that would uncover the needle 116). The cover 118 may be locked by a needle cover non-return element (not shown), such as a catch.

FIG. 2 shows a medicament delivery system 300 comprising a medicament delivery device 100 and a hold assistance device 200. The medicament delivery device 100 may be substantially similar or identical to the injection device 100 shown in FIG. 1 and described above, in which like reference numerals denote alike elements. In the example shown, the medicament delivery device 100 and the hold assistance device 200 are configured to fit together to form the medicament delivery system 300, such that the hold assistance device 200 is arranged to circumscribe at least a portion of the medicament delivery device 100. The hold assistance device 200 may be configured for assembly with the medicament delivery device 100, forming the medicament delivery system 300 for supply to a user, or the hold assistance device 200 and the medicament delivery device 100 may be supplied separately to a user and the user may then assemble the hold assistance device 200 and the medicament delivery device 100 together to form the medicament delivery system 300. It is also envisaged that the hold assistance device 200 may be retrofitted to a medicament delivery device 100, and that the hold assistance device 200 may be used with medicament delivery devices other than that in the example shown in FIG. 1 and described above. In any case, it is envisaged that the hold assistance device 200 may be removable from the medicament delivery device 100, such that the hold assistance device 200 may be reusable. The hold assistance device 200 may also be disposable.

Figure 10:
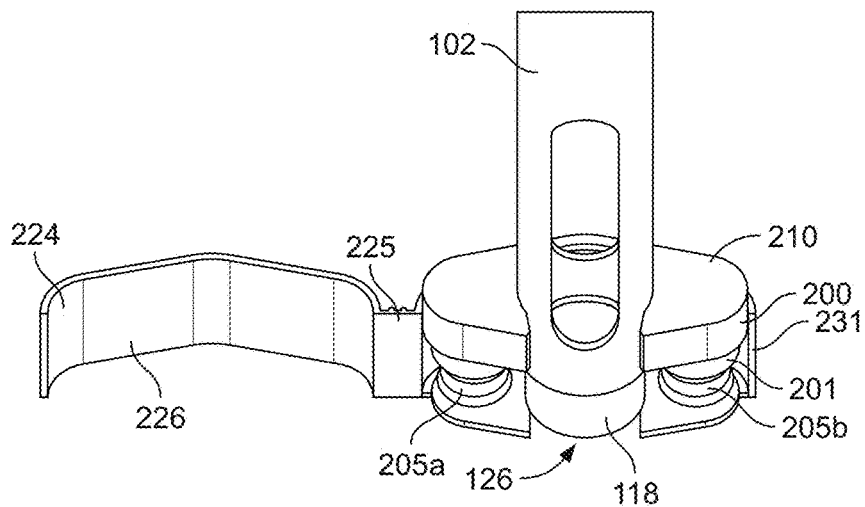
FIG. 10 shows a medicament delivery system.

The hold assistance device 200 comprises a housing 201 configured to be connected to the main body 102 of the medicament delivery device 100, such that the housing 201 is fixedly coupled to the main body 102. The connection between the housing 201 and the main body 102 may be configured to be removable, such that the hold assistance device 200 may be removed from the medicament delivery device 100, for example by means of a clamshell mechanism as shown in FIG. 10 for example, as shall be described below in more detail.

FIG. 3A shows a cross-sectional schematic view of an exemplary hold assistance device 200 as attached to a medicament delivery device 100. For the sake of clarity and conciseness, only the main body 102, the needle cover 118 and the needle 116 of the medicament delivery device 100 are shown, along with a needle cover biasing member 130 in the form of a compression spring. It is though envisaged that the needle cover biasing member 130 does not have to be a compression spring and other forms of biasing member are also possible, such as other types of springs or other forms. Spring 130 is arranged to bias the needle cover 118 towards an extended position (see FIG. 3A) in which the needle cover 118 protrudes from the main body 102 at a distal end 126 of the medicament delivery device 100 such that the needle 116 is covered by the needle cover 118. In the example shown, this is because when the needle cover 118 is in the extended position, the spring 130 is in its natural extended state. Thus, when the needle cover 118 is in a retracted position (see FIG. 3B) in which the needle cover 118 is retracted in a proximal position relative to the extended position such that the needle cover 118 is retracted inside the main body 102 and the needle 116 is not covered by the needle cover 118, the spring 130 is caused to be compressed, thus the spring force 131 which acts in the direction of arrow 131 shown in FIG. 3B will inherently bias the needle cover 118 back towards the extended position shown in FIG. 3A. That is, because moving the needle cover 118 from the extended position to the retracted position goes against the action of the needle cover biasing member 130 by compressing the spring 130, the spring 130 hence biases the needle cover 118 axially in the distal direction towards the extended position. Thus, once the needle cover 118 has been placed into the retracted position, in order to maintain the needle cover 118 in the retracted position so that the needle 116 remains uncovered and can be used for the required duration of time to deliver medicament to a patient, force is required by the user in order to counteract the biasing spring force 131, to prevent the needle cover 118 from extending outwards again.

Figure 3B:
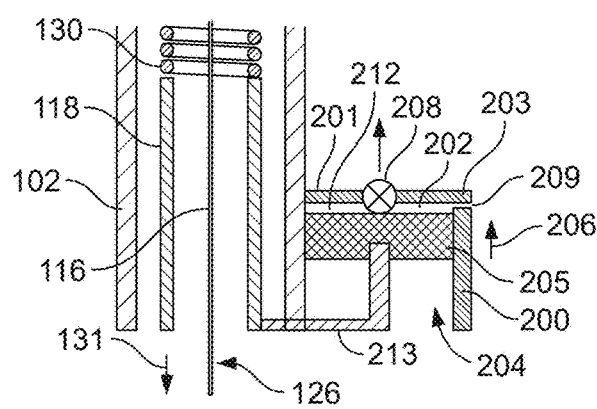
FIG. 3B shows a cross-sectional schematic view of a medicament delivery system.

The hold assistance device 200 acts to counteract the biasing spring force 131, by providing a resistive force thereagainst, in the form of a vacuum force 206 acting in the direction shown in FIG. 3B. In this manner, the hold assistance device 200 reduces the amount of force required from a user to hold the medicament delivery device 100 in a medicament delivery state in which the needle cover 118 is retracted, i.e. reducing the amount of force which needs to be applied by the user to resist the spring force 131. The hold assistance device 200 does this by providing a force in the opposite direction to the biasing force 131 in order to hold the needle cover 118 in the retracted position, to prevent it from inadvertently moving towards the distal end 126 of the medicament delivery device 110, until medicament delivery is complete, at which point the needle cover 118 may be allowed to retract again under the action of the needle cover biasing member 130. In other words, the hold assistance device 200 utilises vacuum pressure to create a force 206 which offsets the user holding force of the medicament delivery device 100, for example which can offset the user holding force of a standard two-step autoinjector. The vacuum force 206 is configured to act generally in a direction away from the distal end 204 of the chamber 202 and towards the proximal end 203 of the chamber 202.

The hold assistance device 200 may be configured such that the magnitude of the vacuum force 206 is scaled, for example based on the surface area of the piston 205, to be designed to be several times stronger than the biasing force 131 of the needle cover biasing member 130, to ensure that substantially all of the biasing force 131 is offset, to sufficiently aid the user in the operation of the medicament delivery system 300 by reducing the hold force required during injection. The vacuum force 206 which assists the hold force required by the user of the medicament delivery system 300 may be equal to, for example, approximately 150 mm$^2$ at a pressure of approximately 0.15 bar. In some examples, the load generated by the needle cover biasing member 130 may be between approximately 5 N and 30 N, for example between approximately 10 N and 15 N, and a total surface area for the pistons 205*a*, 205*b* may be between approximately 60 mm$^2$ and 360 mm$^2$, for example equal to at least approximately 120 mm$^2$ to hold the needle cover biasing member 130 in position, for example a spring under compression, against the action of the biasing force 131.

FIGS. 3A and 3B show an example of a hold assistance device 200 which provides such a resistive counterforce against the biasing force 131 of the needle cover biasing member 130, in the form of a vacuum force 206. In the example shown, the hold assistance device 200 comprises a housing 201 which is configured to be coupled to the main body 102 of the medicament delivery device 100, and a piston 205 which is configured to be coupled to the needle cover 118. Accordingly, when the hold assistance device 200 is attached to the medicament delivery device 100, axial movement of the needle cover 118 relative to the main body 102 is configured to cause corresponding axial movement of the piston 205 relative to the housing 201, whilst the housing 201 and the main body 102 remain fixed relative to one another and remain stationary relative to the sliding parts, the needle cover 118 and the piston 205.

The piston 205 is axially movable inside a chamber 202 for containing air, which may for example be defined by the housing 201. It is though also envisaged that the hold assistance device 200 may comprise any other suitable geometric or mechanical design, and that the housing 201 need not necessarily define the chamber 202, but that the chamber 202 may for example by defined by one or more further additional elements, for example by a chamber body. Nevertheless, it is to be understood in any case that the hold assistance device 200 comprises a housing 201 that is couplable to the main body 102 in order to fixedly connect the hold assistance device 200 to the medicament delivery device 100, and that somewhere in the hold assistance device 200 there is defined a chamber 202 for receiving the piston 205.

The piston 205 is configured to move relative to the chamber 202 inside the chamber 202 between a proximal end 203 of the chamber 202 and a distal end 204 of the chamber 202. Taking the example and illustration orientation shown in FIGS. 3A and 3B for example, it may be said that the piston 205 is configured to move up and down inside the chamber 202. In this manner, the axial position of the piston 205 inside the chamber 202 determines the volume of a free volume 212 of the chamber 202 which can contain air. That is, the position of the piston 205 inside the chamber 202 determines the size of a volume of air 207 which can be contained within the chamber 202.

As shown in FIG. 3A, the piston 205 is arrangeable in an open position inside the chamber 202 in which the piston 205 is arranged proximate to the distal end 204 of the chamber 202 such that the chamber 202 is configured to contain a volume of air 207. When the piston 205 is at a maximum displacement from the proximal end 203 of the chamber 202, the free volume 212 is at a maximum size such that the volume of air 207 is at a maximum volume. That is, when the piston 205 is at a maximum displacement from the proximal end 203 of the chamber 202, the free volume 212 and hence also the volume of air 207 are larger than when the piston 205 is closer to the proximal end 203 of the chamber 202. As shown in FIG. 3A, when the piston 205 is in the open position, in which the piston 205 is arranged at a maximum possible displacement from the proximal end 203 of the chamber such that the piston 205 is arranged proximate to the distal end 204 of the chamber 202, the needle cover 118 is in the extended position in which it covers the needle 116, and the spring 130 is in its natural uncompressed state. The needle cover 118 is coupled to the piston 205 by a connection member 213, which may for example be in the form of an arm or a generally annular element, the connection member 213 being geometrically sized such that when the needle cover 118 is in its extended state, i.e. its lowermost state as seen in the orientation of the illustration of the example of FIG. 3A, the piston 205 is correspondingly also in its lowermost state as seen in the orientation of the illustration of the example of FIG. 3A, which is its open position.

The hold assistance device 200 further comprises an outlet 208 for the flow of air out of the chamber 202, which may for example be formed in the housing 201, for example in an upper surface thereof at the proximal end 203 of the chamber 202. In the example shown, the outlet 208 comprises a one way valve configured to permit air to flow out of the chamber 202 but to prevent air from flowing into the chamber 202. Thus, movement of the piston 205 from the open position shown in FIG. 3A towards the proximal end 203 of the chamber 202, i.e. movement of the piston 205 axially away from the distal end 204 of the chamber 202 and towards the proximal end 203 of the chamber 202, will cause the volume of air 207 to be compressed, and for at least a portion of the volume of air 207 to be expelled from the chamber 202 out through the outlet 208. In other words, movement of the piston 205 from the open position towards the proximal end 203 of the chamber 202 and towards an activated position (see FIG. 3B) causes air to be expelled from the chamber via the outlet 208.

Referring now to FIG. 3B, the piston 205 is arrangeable in an activated position in which the piston 205 is arranged proximate to the proximal end 203 of the chamber 202, such that the piston 205 is at a maximum possible displacement from the distal end 204 of the chamber 202. That is, referring to the exemplary orientation of the illustration of the example of FIGS. 3A and 3B, the piston 205 is at the maximum of its upward stroke within the chamber 202. When the piston 205 is in the activated position, the needle cover 118 is in the retracted position, such that the needle 116 is uncovered, and the needle 116 can thus be used to deliver medicament to a patient. As described above, as the piston 205 moves in the proximal direction away from the distal end 204 of the chamber 202 and towards the proximal end 203 of the chamber, air is expelled from the chamber 202 through the outlet 208, and once the piston 205 reaches the proximal end 203 of the chamber 202, the free volume 212 is substantially close to zero, such that the piston 205 may be in contact with the proximal end 203 of the chamber 202, and such that the volume of air 207 inside the chamber 202 is substantially close to zero. FIG. 3B shows the piston 205 towards the end of its upward stroke as it approaches the proximal end 203 of the chamber 202 just before it reaches the activated position.

When the piston 205 is in the activated position, the chamber 202 is at least partially evacuated of air. For example, the free volume 212 may be approximately zero such that approximately all of the volume of air 207 has been expelled through the outlet 208, such that the chamber 202 is substantially fully evacuated; or the free volume 212 may be substantially small such that substantially all of the volume of air 207 has been expelled through the outlet 208, such that the chamber 202 is almost fully evacuated. The at least partial evacuation of the chamber 202 creates a vacuum force 206, which as shown in FIG. 3B, is generally in the opposite direction to the spring force 131. That is, the action of the volume of air 207 being expelled from the chamber 202 through the outlet 208 creates a sucking force in the form of a vacuum force 206, because the outlet 208 does not permit for any air to flow back into the chamber 202 as the piston 205 compresses the free volume 207. Accordingly, when the piston 205 is in the activated position, the vacuum force 206 is provided, and this resists movement of the piston 205 back towards the distal end 204 of the chamber 202, thus counteracting the biasing force 131 and hence retaining the needle cover 118 in the retracted position.

The hold assistance device 200 may be kept with the piston 205 in the activated position for as long as is needed for the user of the medicament delivery system 300 to deliver medicament from the needle 116 of the medicament delivery device 100 to an injection site of a patient, in order to reduce the amount of force needed to be applied by the user to retain the needle cover 118 in the retracted position in which the needle 116 is uncovered and can be used to deliver medicament. After delivery of the medicament from the needle 116 has been completed, the medicament delivery device 100 may be removed from the injection site of the patient, thus the hold force is no longer required. At this point, it may be desirable to recover the needle 116 with the needle cover 118 for safety and hygiene reasons, to help ensure safe removal and disposal of the medicament delivery device 100 from the injection site. Thus, it may be desired to bring the needle cover 118 back into the extended position in which it covers the needle 116. In order to allow the needle cover 118 to revert back into its extended position, under the action of the biasing force 131, the vacuum force 206 can be removed, or at least reduced in magnitude, in order to reduce or remove the resistance against the biasing force 131, such that the action of the needle cover biasing member 130 may be permitted to cause the needle cover 118 to move back into its extended position.

In order to reduce the magnitude of or remove the vacuum force 206 in order to permit the needle cover 118 to revert back into its extended position, the piston 205 may be permitted to move back towards the distal end 204 of the chamber 202, such that downwards movement of the piston 205 correspondingly causes downwards movement of the needle cover 118. However, when the piston 205 is in the activated position, the chamber 202 is at least partially evacuated of air, and the sucking action caused by the vacuum force 206 prevents the piston 205 from being able to move downwards within the chamber 202. When the piston 205 is in the activated position, initially, no air is able to flow back into the chamber, for example because the outlet 208 may be configured to not permit the flow of air into the chamber for example by being in the form of a one way valve, such that the chamber 202 cannot refill with air in order to remove or overcome the vacuum.

However, the hold assistance device 200 may be configured such that after medicament delivery has been completed and it is desired to move the needle cover 118 back into the extended position to cover the needle 116, air can be permitted to flow back into the chamber 202 to refill it with air, to remove, or at least reduce the magnitude of, the vacuum force 206, to permit the piston 205 to move away from the activated position and back downwards towards the distal end 204 of the chamber 202. An exemplary means for permitting the chamber 202 to refill with air to allow this to happen shall now be described, with reference to FIGS. 4A to 4C.

Figure 4A:
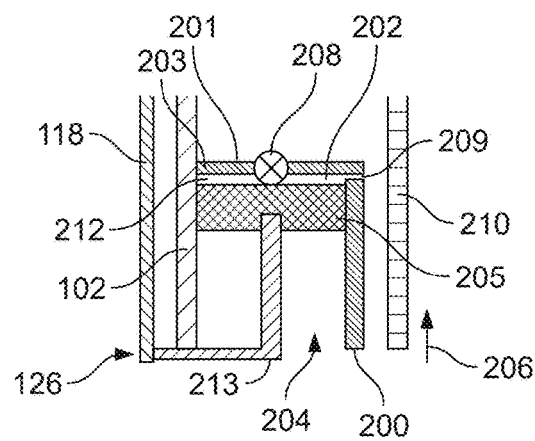
FIG. 4A shows a cross-sectional schematic view of a medicament delivery system.

As shown in FIG. 4A, the hold assistance device 200 may further comprise a sealing member 210, which may for example be in the form of a sleeve circumscribing at least a portion of the housing 201 and/or the chamber 202. The hold assistance device 200 may further comprise an inlet 209 for the flow of air into the chamber 202. The inlet 209 may comprise an aperture or a two way valve for example. In the example shown, the inlet 209 comprises an aperture. The inlet 209 may be formed in the housing 201, or in another part of the hold assistance device 200 which defines the chamber 202. In any case, the inlet 209 is positioned and configured to provide a fluid flow path for the flow of air into the chamber 202. The inlet 109 may be sized relative to the surface area of the piston 205, and hence relative to the magnitude of the vacuum force 206, such that the area ratio between the surface area of the piston 205 and the surface area of the inlet 209 allows for a sufficiently high gearing ratio, whereby a substantially miniscule force is required in order to release the vacuum compared with the suction action generated by the vacuum force 206 in order to retain the needle cover 118 in the retracted position.

As described above, the piston 205 is arrangeable in an activated position in which a vacuum force 206 is provided to resist downwards movement of the piston 205 towards the distal end 204 of the chamber 202 and hence to reduce the amount of user hold force needed to maintain the needle cover 118 in the retracted position against the biasing force 131 of the needle cover biasing member 130. However, once medicament delivery has been completed, it is desirable for the needle cover 118 to be moved back into the extended position, and in order to actuate this, the piston 205 may be removed from the activated position.

In the example shown, when the piston 205 is initially arranged in the activated position in order to commence medicament delivery, the sealing member 210 is arranged to cover the inlet 209 such that the inlet 209 is sealed and obstructed by the sealing member 210. FIG. 4A shows the sealing member 210 in a first position in which the sealing member 210 obstructs the inlet 209 such that the inlet 209 is sealed. When the sealing member 210 is in this position, the flow of air into the inlet 209 is blocked such that air cannot flow into the chamber 202 via the inlet 209, thus the chamber 202 cannot refill with air and the vacuum force 206 is maintained.

Figure 4B:
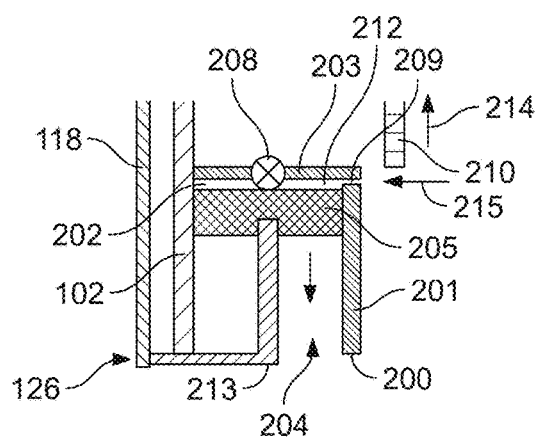
FIG. 4B shows a cross-sectional schematic view of a medicament delivery system.

In order to permit the piston 205 to be moved out of the activated position, the sealing member 210 may be moved into a second position as shown in FIG. 4B, such that it no longer covers or obstructs the inlet 209, such that the inlet 209 is at least partially uncovered by the sealing member 210, thus unsealing it, such that air is permitted to flow into the chamber 202 via the inlet 209. Though, it is envisaged that the sealing member 210 need not necessarily be present and that the inlet 209 may be selectively sealed and unsealed or otherwise obstructed or blocked and unobstructed or unblocked by any other suitable means. For example, the inlet 209 may be selectively sealed by placing the inlet 209 against the skin of the patient, such that removal of the medicament delivery device 100 from the injection site causes the patient's skin to no longer cover and hence obstruct the inlet 209, such that air is then free to flow into the inlet 209 fill the chamber 202. Similarly, it is envisaged that the inlet 209 may be selectively sealed by placing the inlet 209 against the skin of the user operating the medicament delivery device 100, for example by the user gripping their hand around the medicament delivery device 100 to cover the inlet 209. Once their grip is removed or change, the inlet 209 may then become unobstructed, such that air is free to flow into the inlet 209 to fill the chamber 202.

Turning back to FIG. 4A, the sealing member 210 may for example comprise a sleeve arranged to circumscribe the chamber which may be configured to be in an extended state when the piston 205 is arranged in the activated position, in which the sealing member 210 is arranged in a distal position relative to the distal end 204 of the chamber 203, as shown in FIG. 4A. The sealing member 210 sleeve may be configured to be axially movable, i.e. slidable relative to the housing 201 and to the main body 102. When the user has completed medicament delivery and wishes to recover the needle 116 with the needle cover 118, they may then for example slide the sealing member 210 upwards along sealing member unsealing direction 214, towards the proximal end 128 of the medicament delivery device 110, to move it into a position in which it no longer fully covers or obstructs the inlet 209 such that the inlet 209 is unsealed, as shown in FIG. 4B. Air can then flow along air inlet flow path 215 into the chamber 202 via the inlet 209, such that the vacuum is removed and the piston 205 is permitted to move downwards towards the distal end 204 of the chamber 202, as shown in FIG. 4C, thus allowing the needle cover 118 to revert back to its extended position under the action of the biasing force 131.

In another example, the sealing member 210 may for example be coupled to the needle cover 118 such that movement of the needle cover 118 from the extended position to the retracted position, for example by pulling back the sealing member 210 towards the proximal end 128 of the medicament delivery device 100, whilst causing the piston 205 to be placed into the activated position and for the chamber 202 to be evacuated, also causes the sealing member 210 to also slide into a retracted position whereby the inlet 209 is blocked thereby to seal it. Then, for example, subsequent movement of the needle cover 118 back towards the extended position, for example by sliding it forwards back towards the distal end 126 of the medicament delivery device 100, may correspond with movement of the sealing member 210 into an extended position whereby the inlet 209 is not blocked thereby, such that the inlet 209 is unsealed.

It is envisaged that the sealing member 210 may have any suitable geometric and mechanical design, and may be configured as desired for a given medicament delivery system 300 to selectively cover and uncover the inlet 209 as desired. When the piston 205 is initially placed into the activated position, the sealing member 210 covers and seals the inlet 209, and after medicament delivery is complete, the user is able to selectively uncover and hence unseal the inlet 209 in order to permit movement of the piston 205 out of the activated position.

Figure 4C:
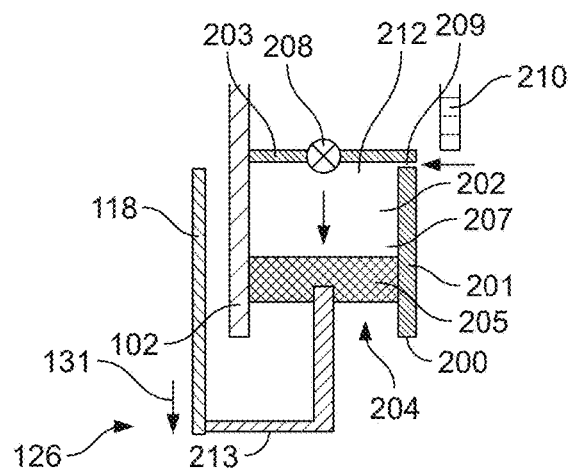
FIG. 4C shows a cross-sectional schematic view of a medicament delivery system.
Figure 5:
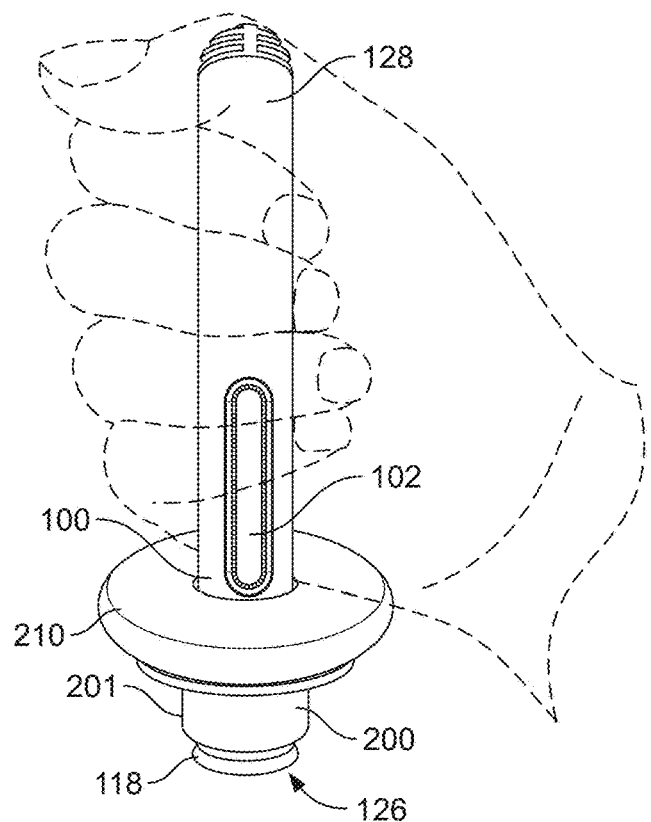
FIG. 5 shows a medicament delivery system held in a user's hand.

An exemplary sealing member 210 is shown in FIGS. 4A to 4C and is described above. Another exemplary sealing member 210 is shown in FIG. 5, in the form of a push pad or shroud element. In the example of FIG. 5, when the user places the medicament delivery device 100 against the injection site of a patient and applies a downward force on the medicament delivery device 100 to push the needle cover 118 inwards to its retracted position to uncover the needle 116 and insert the needle 116 into the patient's skin, the downward force applied causes the sealing member 210 push pad or shroud to be pushed downwards, similarly to as shown in FIG. 4A, such that the sealing member 210 covers the inlet 209. Then, when medicament delivery is complete and the user removes the downward force, i.e. when user pressure on the sealing member 210 push pad or shroud is removed, the sealing member 210 push pad or shroud is caused to move upwards again, similarly to as shown in FIGS. 4B and 4C, such that the inlet 209 is no longer fully covered or obstructed thereby, and air is permitted to flow back into the chamber 202.

Figure 6:
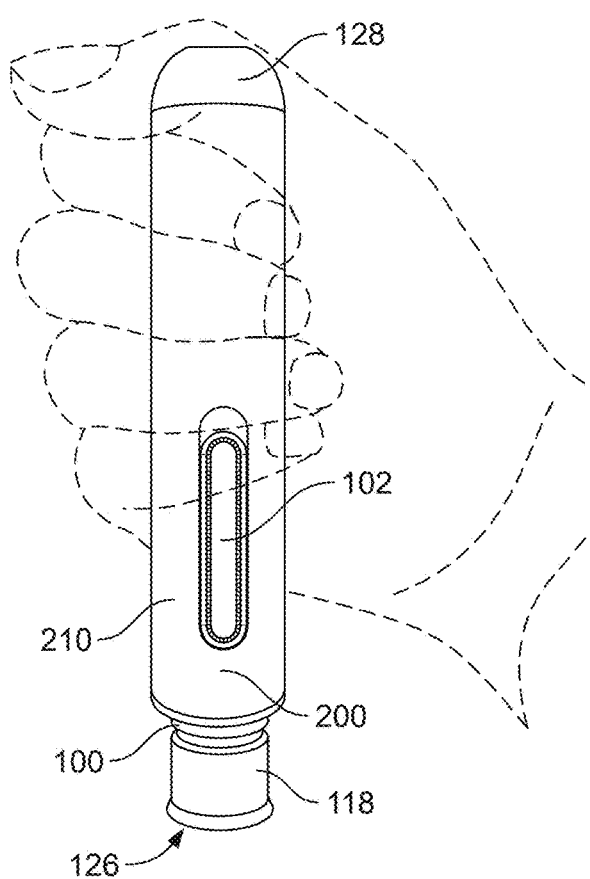
FIG. 6 shows a medicament delivery system held in a user's hand.

Another exemplary sealing member 210 is shown in FIG. 6, in the form of a generally cylindrical sleeve which circumscribes the main body 102 and/or the housing 201. Similarly to the push pad or shroud shown in FIG. 5, the sealing member 210 sleeve may be selectively pushed or pulled by the user in order to selectively cover and uncover the inlet 209. For example, downward pressure may be applied onto the sealing member 210 sleeve by the user when applying a downward force to the medicament delivery device 100 at the injection site of the user, and the removal of the downward pressure once medicament delivery is complete and the medicament delivery device 100 is moved away from the user's skin may then cause or allow the sealing member 210 sleeve to be disabled by it automatically moving upwards, or by permitting it to be manually pulled upwards to disable its sealing function relative to the inlet 209.

The hold assistance device 200 may further comprise a reservoir (not shown) configured to be filled with air when the piston 205 is moved into the activated position, wherein the reservoir is configured to emit a signal, for example a sound, for a fixed duration of time, starting upon movement of the piston 205 into the activated position. The reservoir may thus be configured to send an audible indication in the form of a whistling sound for example, which stops in time with the delivery of a medicament being complete, air filling the reservoir during activation and whistling for a fixed duration of time. The reservoir may thus act as a timer, to indicate to the user when medicament delivery is complete and thus when the sealing member 210 may be moved to unseal the inlet 209, to safely and hygienically remove the medicament delivery device 100 from the injection site.

FIGS. 7A to 7C show another exemplary hold assistance device 200 in which a sealing member biasing member 211, for example in the form of a spring, is arranged to bias the sealing member 210 into a position in which the inlet 209 is unsealed or sealed, as desired. The spring force of the sealing member biasing member 211 may be configured to be relatively weak, for example to be relatively weak compared with the biasing force 131 of the needle cover biasing member 130, such that the amount of user force required to move against the sealing member biasing member 210 is lower than the amount of user force required to overcome the biasing force 131 of the needle cover biasing member 130, which is assisted by the vacuum force 206 nonetheless.

For example, the sealing member 210 may be pulled down from a retracted position as shown in FIG. 7A in which air is free to flow into the chamber 202 into an extended position as shown in FIGS. 7B and 7C in which air is not permitted to flow into the chamber 202. Pulling the sealing member 210 down in this way causes extension of the spring 211, acting against the biasing action of the sealing member biasing member 211, hence subsequent removal of the pulling force automatically causes the sealing member 210 to move back upwards into the retracted position in which air is free to flow back into the chamber 202, once it is desired to permit the piston 205 to move out of the activated position upon completion of medicament delivery. FIG. 7C shows the piston 205 in the activated position. In the example shown, the piston 205 is generally annular and is configured to interface with a lip seal 216 for selectively providing the sucking action of the vacuum force 260 and for selectively permitting and preventing the flow of air into and out of the chamber 202 as required. The annular piston 205 may have a thickness of approximately 2 mm for example.

FIG. 8 shows another exemplary hold assistance device 200 in which the piston 205 comprises a sealing portion 217, for example in the form of a lip seal, for interfacing with the proximal end 203 of the chamber 202, such that movement of the piston 205 upwards into the activated position causes the sealing portion 217 to interface with the proximal end 203 of the chamber 202 with suction. The sealing portion 217 may be configured to obstruct or block a combined inlet and outlet 208, 209 of the hold assistance device 200 in the form of an aperture 218. That is, the aperture 218 may be configured to act as an inlet and an outlet, to provide for the flow of air into and out of the chamber 202. The aperture 218 may permit the flow of air out of the chamber 212 as the piston 205 moves upwards towards the activated position, in order to permit the evacuation of the chamber to produce the vacuum force 206.

The sealing member 210 may be in the form of a flap or an elastic element, for example a pivotable or deformable flap, to selectively block the aperture 218. The sealing member 210 may be actuated by an actuation member 219 which may be pushed down into contact with the sealing member 210 by an actuation force 220, in order to cause the sealing member 210 to block the aperture 218, to prevent the flow of air into the cavity 202, during medicament delivery. Once medicament delivery has been completed, the user may remove the actuation force 220 by no longer pressing down onto the actuation member 219, thus causing the sealing member 210 to pivot or revert back upwards for example, back into the position shown in FIG. 8, such that the aperture 218 is no longer blocked or covered, and air is free to flow back into the cavity 202, thus removing the vacuum such that the resistance against movement of the piston 205 towards the distal end 204 of the chamber 202 is reduced or removed.

FIG. 9 shows an exemplary hold assistance device 200 which is substantially similar to those described above, and in which like reference numerals denote like elements. The hold assistance device 200 of FIG. 9 differs from those illustrated and described above in that the hold assistance device 200 is initially assembled in a pre-evacuated state such that the chamber 202 is already evacuated and the piston 205 is already in the activated position when the hold assistance device 200 is fitted together with the medicament delivery device 100. That is, the needle sleeve 118 is configured to attach to a pre-inserted piston 205 sitting in an already evacuated chamber 202. Hence, before medicament delivery has taken place, when the needle cover 118 is in the extended position covering the needle 116, the piston 205 is already in the activated position. That is, in other examples described above, movement of the needle cover 118 from the extended position to the retracted position causes movement of the piston 205 from an open position in which the piston 205 is arranged proximate to the distal end 204 of the chamber 202, to the activated position, and thus happens simultaneously therewith. However, in the example of FIG. 9, the piston 205 is already in the activated position in an initial assembled state, when the needle cover 118 is in the extended position, hence movement of the needle cover 118 is not required in order to place the piston 205 in the activated position. The piston 205 may be placed in the activated position during or after assembly of the component parts of the hold assistance device 200, and before the hold assistance device 200 is fitted to the medicament delivery device 100. Where the hold assistance device 200 is initially assembled in a pre-evacuated state such that the chamber 202 is already evacuated and the piston 205 is already in the activated position, the outlet 208 may be omitted.

In the example of FIG. 9, axial movement of the needle cover 118 relative to the main body 102 still corresponds with and causes movement of the connection member 213 and hence also the piston 205 which is coupled thereto. However, since the piston 205 is initially already in its most upwards position within the chamber 202, i.e. the activated position, when the needle cover 118 is in its most downwards position in its extended position, upwards axial movement of the needle cover 118 into the retracted position for medicament delivery cannot and does not cause any further upwards, i.e. towards the proximal end 203 of the chamber 202, movement of the piston 205 relative to the chamber 202. This is because at this stage, the piston 205 is already at its maximum possible displacement away from the distal end 204 of the chamber 202.

Therefore, in the example of FIG. 9, the piston 205 and the chamber 202 are together axially movable relative to the housing 201. The hold assistance device 200 may further comprise a chamber body 221 defining the chamber 202 and configured to be slidably received in the housing 201. A coupling member 222, for example in the form of a clip configured to be received in and form a snap fit with a corresponding aperture, groove or recess 223 in the housing 201 is attached to the chamber body 221. The piston 205 is configured to move upwards together with the chamber body 221 upon movement of the needle cover 118 from the extended position to the retracted position, due to the action of the vacuum force 206, which sucks the piston 205 up towards the proximal end 203 of the chamber 202. Thus, upon movement of the needle cover 118 from the extended position to the retracted position, due to the coupling action of the connection member 213 fixing the piston 205 to the needle cover 118, the piston 205 and the chamber body 221 together are caused to slide upwards, towards the proximal end 128 of the medicament delivery device 110, relative to and inside the housing 201. This causes the coupling member 222, for example a clip thereof, to be received by and form a connection, for example a snap fit, with the housing 201, such that the chamber body 221 is retained in the housing 201 in an axially fixed position. In such an example, the amount of user force required to move the needle cover 118 from the extended position to the retracted position ready for medicament delivery is thereby reduced, because the user no longer needs to overcome the glide force of the piston 205 within the chamber 202, since the piston 205 is already in the activated position. In other words, to overcome the glide friction while evacuating the chamber 202 by movement of the piston 205, which would otherwise add to the activation force needed to be applied by the user to place the medicament delivery device 100 into a state ready for medicament delivery to commence, the chamber 202 and the piston 205 can be pre-assembled and simply clip into the housing 201 during activation. This way, the only force required is that to deflect the snap fit of the coupling member 222 with the housing 201 which hooks the chamber 202 to the housing 201, which would be lower than the piston glide force.

After medicament delivery has been completed, air may be permitted to flow back into the chamber 202 again, for example through an air inlet flow path 215 via a selectively sealable inlet 209, for example as described above, such that the piston 205 is no longer resisted from being able to move towards the distal end 204 of the chamber 202. The piston 205 is thus then permitted to move downwards, as the volume of air 207 inside the chamber 202 increases, thus permitting the needle cover 118 to move back outwards again into the extended position.

FIG. 10 shows an exemplary hold assistance device 200 comprising two pistons 205a, 205b arranged on opposite sides of the main body 102 of the medicament delivery device 100. The pistons 205a, 205b are substantially similar to the pistons 205 described above, and are configured to move relative to and inside two respective chambers 202 which are defined in the housing 201 on opposite sides of the main body 102 of the medicament delivery device 100. It is envisaged that in the exemplary hold assistance device 200 shown in FIG. 10, and in the other exemplary hold assistance devices 200 described and shown herein, the piston 205 may comprise any number of one or more pistons 205, for example one, two, three, four, five or more pistons 205. In the case of there being more than one piston 205, the pistons 205 may be arranged to be diametrically opposed, or otherwise circumferentially spaced apart from one another about the medicament delivery device 100.

In the case of there being one piston 205, the piston may be annular and circumscribe the medicament delivery device 100. Each of the pistons 205 may comprise a cup seal and/or one or more suction cups for interfacing with the proximal end 203 of the chamber 202. Each of the pistons 205 may be generally cylindrical. In the case of each of the pistons 205 comprising a cup seal, the cup seal may be flexible and can deflect forwards under positive pressure, allowing air to vent. Once under negative pressure, the cup seal may engage with the proximal end 203 of the chamber 202, thus sealing in the vacuum. A cup seal can thus act as a one way valve, in order to permit air to flow out of the chamber 202, but not to permit air to flow back into the chamber 202.

In some examples, the load generated by the needle cover biasing member 130 may be between approximately 5 N and 30 N, for example between approximately 10 N and 15 N, and a total surface area for the pistons 205a, 205b may be between approximately 60 mm$^2$ and 360 mm$^2$, for example equal to at least approximately 120 mm$^2$ to hold the needle cover biasing member 130 in position, for example a spring under compression, against the action of the biasing force 131.

Figure 11:
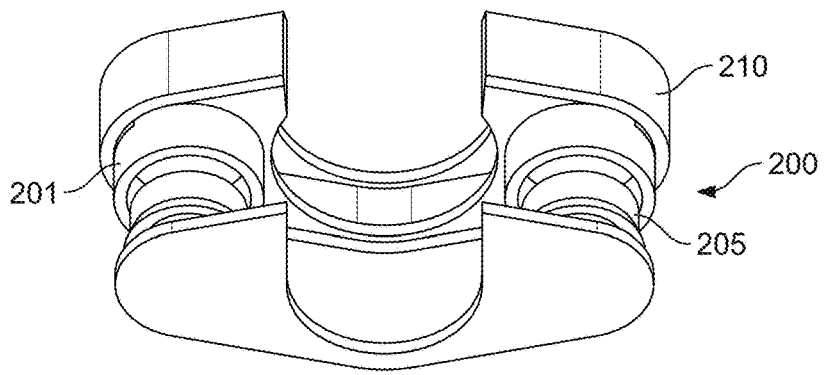
FIG. 11 shows a hold assistance device.

As shown in FIG. 11, in which the clamshell cover 226 has been omitted purely for illustrative purposes, the hold assistance device 200 may be generally C-shaped or U-shaped and may comprise a recess, groove or channel for receiving the medicament delivery device 100, so that the medicament delivery device 100 may be inserted into the hold assistance device 200 or the hold assistance device 200 may similarly be clipped onto the medicament delivery device 100, as shown, for example by radially inserting or axially sliding the hold assistance device 200 relative to the medicament delivery device 100. In order to then close the hold assistance device 200 around the medicament delivery device 100 in order to secure it in place and prevent inadvertent decoupling thereof, the hold assistance device 200 may be configured to close around the medicament delivery device 100 by, for example a clamshell mechanism.

For example, the hold assistance device 200 may further comprise a casing 224 configured to circumscribe the chambers 202, and the pistons 205a, 205b. The casing 224 may comprise a flexible joint 225 and a clamshell cover 226 for closure of the casing 224 around the other parts of the hold assistance device 200 and around the main body 102 and the needle cover 118 of the medicament delivery device 100, to provide a clamshell closure of the hold assistance device 200. The casing 224 may comprise a clasp 231 to lock the clamshell cover 226 in a closed position. In the example shown, the connection member 213 is integrally formed with the casing 224 (see FIG. 12). The casing 224 may be connectable to the needle sleeve 218, and may be axially movable relative to the housing 201 and to the main body 102. Via the connection member 213, the casing 224 may thus be axially movable together with the pistons 205a, 205b.

The clamshell mechanism of the casing 224 may be reopened after medicament delivery has been completed, in order to remove the hold assistance device 200 from the medicament delivery device 100. For example, the clamshell cover 226 may be opened, to the position shown in FIG. 10, such that the hold assistance device 200 may then be removed from the main body 102 and the needle cover 118. The clamshell mechanism of the casing 224 may then be closed around another medicament delivery device 100 in order to reuse the hold assistance device 200, or the hold assistance device 200 may be disposed of.

Figure 12:
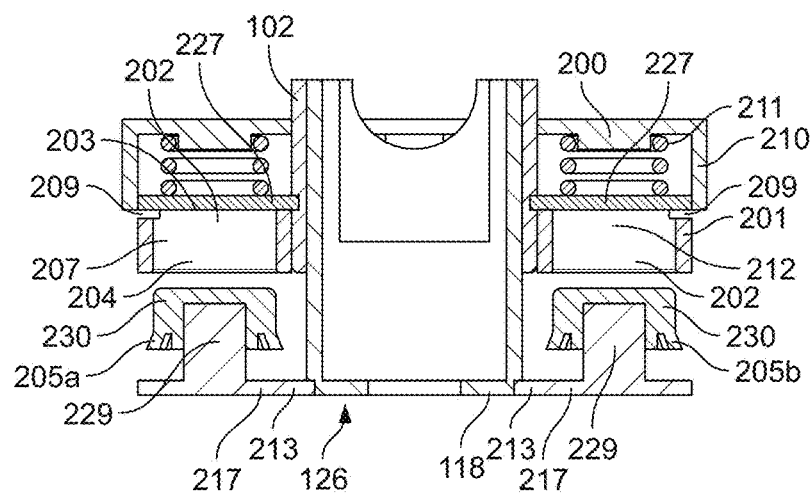
FIG. 12 shows a cross-sectional schematic view of a medicament delivery system.

FIG. 12 shows a cross-sectional schematic view of the hold assistance device 200 of FIG. 10. In the example shown, the sealing member 210 is in the form of a push pad configured to be pushed downwards upon placement of the medicament delivery device 100 at an injection site of a user. When the sealing member 210 push pad is pushed downwards, in a direction towards the distal ends 204 of the chambers 202, the sealing member 210 push pad obstructs the inlets 209 such that air is prevented from flowing into the chambers 202, so that when the pistons 205a, 205b are in the activated position, the vacuum force 206 is maintained. The inlets 209 are formed as apertures in the side of the housing 201 in the example shown.

The geometry of the housing 201 defines two chambers 202 on opposite sides of the hold assistance device 200, for receiving the pistons 205a, 205b respectively. The housing 201 comprises one or more protrusions 227 for being received in one or more corresponding apertures, recesses, channels or grooves of the main body 102, in order to fixedly couple the housing 201 to the main body 102. The casing 224 comprises two flanges 217 which form two connection members 213 for coupling the pistons 205a, 205b to the needle cover 118. In the example shown, the needle cover 118 comprise one or more apertures, recesses, channels or grooves for receiving the flanges 217 in order to couple the casing 224 to the needle cover 118. The casing 224 is further integrally formed with or coupled to two piston arms 229 to which are attached two piston heads 230 to form the pistons 205a, 205b. In the example shown, each of the piston heads 230 comprises a cup seal for forming a sucking connection with the proximal end 203 of the chamber 202 when the pistons 205a, 205b are in the activated position. Each of the cup seals may be flexible and can deflect forwards under positive pressure, allowing air to vent. Once under negative pressure, the cup seal may engage with the proximal end 203 of the chamber 202, thus sealing in the vacuum. A cup seal can thus act as a one way valve, in order to permit air to flow out of the chamber 202, but not to permit air to flow back into the chamber 202.

Figure 13:
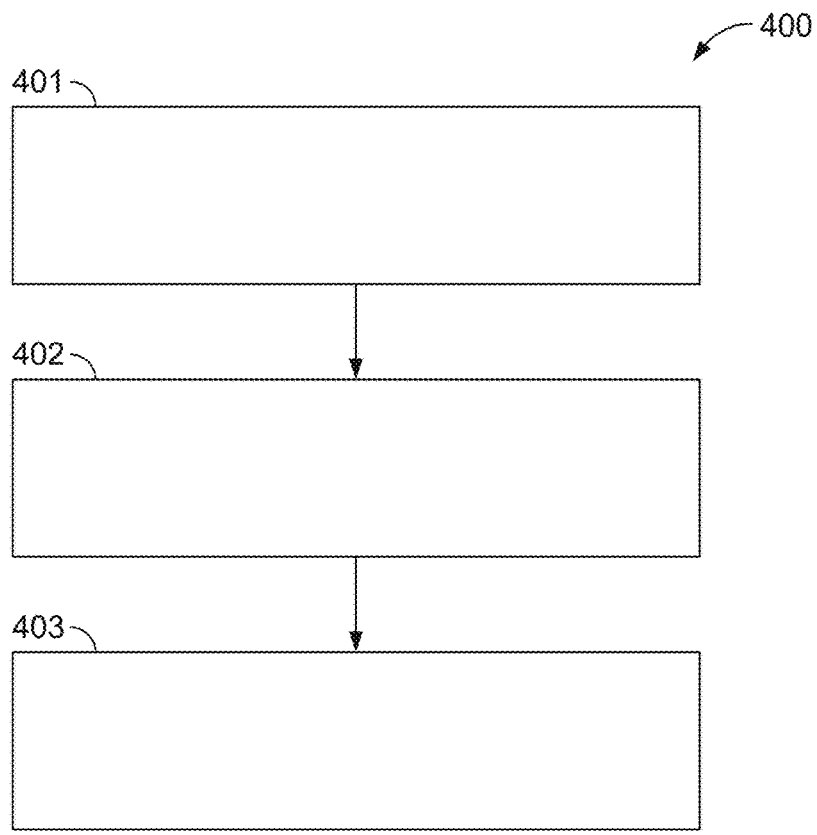
FIG. 13 shows a flowchart depicting a method of operating a medicament delivery system.
Figure 14:
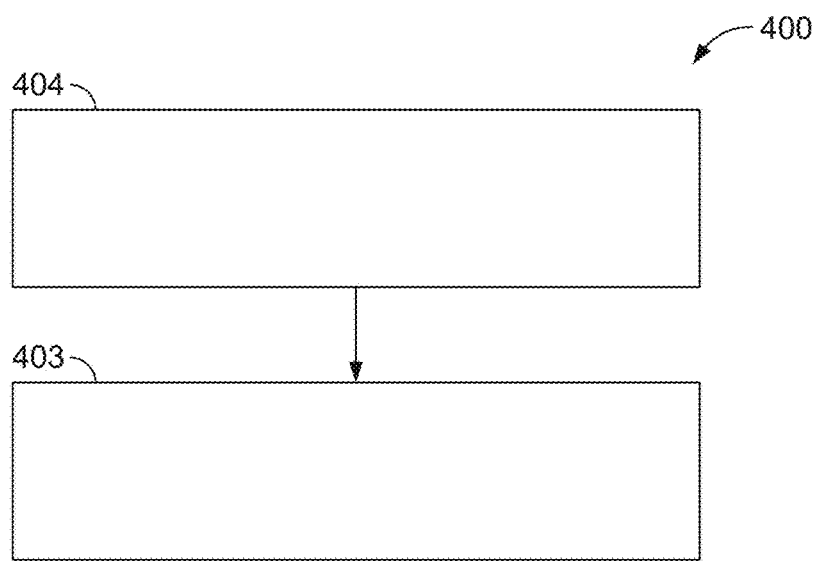
FIG. 14 shows a flowchart depicting a method of operating a medicament delivery system.

FIGS. 13 and 14 show flowcharts depicting exemplary methods 400 of operating a medicament delivery system 300, for example medicament delivery systems 300 as described above.

The exemplary method 400 of FIG. 13 comprise a step 401 of arranging the piston 205 of the hold assistance device 200 in the activated position. Then, in a step 402, the method 400 comprises axially moving the needle cover 118 relative to the main body 102 from the extended position to the retracted position. Next, in a step 403, the method 400 comprises unsealing the inlet 209 to the chamber 202 to permit air to flow into the chamber 202, such that the magnitude of the vacuum force 206 is reduced, such that the piston 205 is permitted to move from the activated position to a position proximate to the distal end 204 of the chamber 202, and such that the needle cover 118 correspondingly moves from the retracted position towards the extended position. The exemplary method 400 of FIG. 13 may for example be used to operate a medicament delivery system 300 comprising a hold assistance device 200 such as that shown in FIG. 9, in which the chamber 202 is pre-evacuated before the hold assistance device 200 is assembled together with the medicament delivery device 100, such that the chamber 202 is already evacuated before the needle sleeve 118 is moved from the extended position to the retracted position.

The exemplary method of 400 of FIG. 14 is substantially similar to that of FIG. 13, except that steps 401 and 402 take place simultaneously, and are thus denoted in FIG. 14 as combined step 404. In step 404, axially moving the needle cover 118 relative to the main body 102 from the extended position to the retracted position causes the piston 205 to be moved into the activated position, such that when the needle cover 118 is in the retracted position the piston 205 is in the activated position, and such that when the needle cover 118 is in the extended position the piston 205 is not in the activated position. The method 400 of FIG. 14 further comprises step 403, in which the method 400 comprises unsealing the inlet 209 to the chamber 202 to permit air to flow into the chamber 202, such that the magnitude of the vacuum force 206 is reduced, such that the piston 205 is permitted to move from the activated position to a position proximate to the distal end 204 of the chamber 202, and such that the needle cover 118 correspondingly moves from the retracted position towards the extended position. The exemplary method 400 of FIG. 14 may for example be used to operate a medicament delivery system 300 comprising a hold assistance device 200 such as the examples shown in FIG. 3A, 3B, 4A, 4B, 4C, 7A, 7B, 7C, or 8.

In the exemplary methods of FIGS. 13 and 14, the step 403 of unsealing the inlet 209 to the chamber 202 to permit air to flow into the chamber 202 may comprise the user of the medicament delivery system 300 moving a sealing member 210 to selectively uncover or unblock and hence unseal the inlet 209. The movement of the sealing member 210 may be actuated manually by the user moving the sealing member 210 after the medicament has been delivered, or the movement of the sealing member 210 may be actuated automatically by the user removing the medicament delivery device 100 from the injection site of the patient and/or by reducing the hold force or pressure applied thereto, for example under the action of a sealing member biasing member 211 as exemplified above.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Those of skill in the art will understand that modifications (additions and/or removals) of various components of the embodiments described herein may be made without departing from the full scope and spirit of the present invention, which encompass such modifications and any and all equivalents thereof.

LIST OF REFERENCE NUMBERS

100—injection device
102—outer casing/housing/main body
104—reservoir
106—plunger 108—collar
110—cap
112—longitudinal axis
113—stopper
114—rear casing
116—needle
118—needle shroud/sleeve/cover
120—control spring
122—drive spring
126—distal end
128—proximal end
130—needle cover biasing member
131—direction of biasing force
200—hold assistance device
201—housing
202—chamber
203—proximal end of chamber
204—distal end of chamber
205—piston
206—direction of vacuum force
207—volume of air
208—outlet
209—inlet
210—sealing member
211—sealing member biasing member
212—free volume
213—connection member
214—sealing member unsealing direction
215—air inlet flow path
216—lip seal
217—sealing portion
218—aperture
219—actuation member
220—actuation force
221—chamber body
222—coupling member
223—aperture, groove or recess
224—casing
225—flexible joint
226—clamshell cover
227—protrusions
228—flanges
229—piston arms
230—piston heads
231—clasp
300—medicament delivery system
400—method
401—method step
402—method step
403—method step

The invention claimed is:

1. A hold assistance device for use with a medicament delivery device, the hold assistance device comprising:
a housing configured to be coupled to the medicament delivery device;
a chamber for containing air, the chamber having a proximal end and a distal end; and
a piston movable within the chamber between the proximal end and the distal end of the chamber, and
wherein when the piston is in an activated position inside the chamber, the piston is arranged proximate to the proximal end of the chamber such that the chamber is at least partially evacuated of air and movement of the piston towards the distal end of the chamber is resisted by a vacuum force, and
wherein the piston comprises a cup seal or a lip seal configured to adhere to the proximal end of the chamber when the piston is in the activated position, such that adherence of the cup seal or lip seal to the chamber provides the vacuum force and prevents a flow of air into the chamber.

2. The hold assistance device of claim 1, wherein the vacuum force is configured to act in a direction away from the distal end of the chamber and towards the proximal end of the chamber.

3. The hold assistance device of claim 1, wherein the piston is arrangeable in an open position inside the chamber, and wherein the piston is arranged proximate to the distal end of the chamber such that the chamber is configured to contain a volume of air.

4. The hold assistance device of claim 3, wherein the chamber comprises an outlet configured to permit a flow of air out of the chamber, wherein a movement of the piston from the open position to the activated position causes at least a portion of the volume of air contained within the chamber to be expelled out from the chamber via the outlet.

5. The hold assistance device of claim 4, wherein the outlet comprises a one-way valve configured to permit the flow of air out of the chamber and to not permit the flow of air into the chamber.

6. The hold assistance device of claim 1, wherein a movement of the piston away from the distal end of the chamber and towards the proximal end of the chamber causes at least a portion of a volume of air contained within the chamber when the piston is arranged proximal to the distal end of the chamber to be evacuated from the chamber, to provide the vacuum force when the piston is in the activated position.

7. The hold assistance device of claim 1, wherein the chamber comprises an inlet for a flow of air into the chamber, wherein the inlet is sealable such that, when the piston is in the activated position and the inlet is sealed, air is prevented from flowing into the chamber to maintain the vacuum force.

8. The hold assistance device of claim 7, wherein the inlet is configured to be selectively unsealed, such that, when the piston is in the activated position and the inlet is unsealed, air is permitted to flow into the chamber, causing the vacuum force to be reduced in magnitude to permit a movement of the piston towards the distal end of the chamber.

9. The hold assistance device of claim 7, wherein the hold assistance device further comprises a sealing member slidable relative to the chamber, wherein when the piston is in the activated position, the sealing member is arrangeable relative to the chamber in a first position in which the sealing member obstructs the inlet such that the inlet is sealed, and in a second position in which the inlet is at least partially unobstructed by the sealing member such that the inlet is not sealed and air is permitted to flow into the chamber.

10. The hold assistance device of claim 9, wherein the hold assistance device further comprises a sealing member biasing member configured to bias the sealing member axially in a distal direction towards the first position of the sealing member.

11. The hold assistance device of claim 1, wherein the piston comprises one or more suction cups configured to adhere to the proximal end of the chamber when the piston is in the activated position, such that adherence of the one or more suction cups to the chamber provides the vacuum force and prevents a flow of air into the chamber.

12. The hold assistance device of claim 1, wherein the piston is slidable inside the chamber such that a free volume for receiving air inside the chamber is greater when the piston is arranged proximate to the distal end of the chamber than when the piston is arranged proximate to the proximal end of the chamber.

13. A medicament delivery system comprising a hold assistance device and a medicament delivery device,
wherein the hold assistance device comprises:
a housing configured to be coupled to a main body of the medicament delivery device;
a chamber for containing air, the chamber having a proximal end and a distal end; and
a piston movable within the chamber between the proximal end and the distal end of the chamber,
wherein the piston is arrangeable in an activated position inside the chamber, wherein the piston is arranged proximate to the proximal end of the chamber such that the chamber is at least partially evacuated of air and movement of the piston towards the distal end of the chamber is resisted by a vacuum force,
wherein the medicament delivery device comprises:
the main body configured to receive a medicament cartridge and comprising a proximal end and a distal end;
a needle for delivery of a medicament from the medicament cartridge;
a needle cover axially movable relative to the main body between:
an extended position in which the needle cover extends from the distal end of the main body and covers a distal end of the needle which protrudes from the main body; and a retracted position in which the needle cover is arranged in a proximal position relative to the extended position such that the distal end of the needle protrudes from a distal end of the needle cover; and
a needle cover biasing member configured to bias the needle cover axially in a distal direction towards the extended position, and
wherein the piston is configured to be coupled to the needle cover, such that when the piston is coupled to the needle cover, an axial movement of the needle cover relative to the main body causes an axial movement of the piston relative to the housing.

14. The medicament delivery system of claim 13, wherein the vacuum force is configured to act generally in an opposite direction to a biasing force of the needle cover biasing member, such that when the piston is in the activated position, the hold assistance device is configured to bias the needle cover axially in a proximal direction towards the retracted position.

15. The medicament delivery system of claim 13, wherein the needle cover biasing member comprises one or more springs.

16. The medicament delivery system of claim 13, wherein the medicament delivery system further comprises a medicament cartridge containing medicament.

17. A method of operating a medicament delivery system that comprises a hold assistance device and a medicament delivery device,
wherein the hold assistance device comprises:
a housing configured to be coupled to a main body of the medicament delivery device;
a chamber for containing air, the chamber having a proximal end and a distal end; and
a piston movable within the chamber between the proximal end and the distal end of the chamber,
wherein the piston is arrangeable in an activated position inside the chamber, wherein the piston is arranged proximate to the proximal end of the chamber such that the chamber is at least partially evacuated of air and movement of the piston towards the distal end of the chamber is resisted by a vacuum force,
wherein the medicament delivery device comprises:
the main body configured to receive a medicament cartridge and comprising a proximal end and a distal end;
a needle for delivery of a medicament from the medicament cartridge;
a needle cover axially movable relative to the main body between:
an extended position in which the needle cover extends from the distal end of the main body and covers a distal end of the needle which protrudes from the main body; and a retracted position in which the needle cover is arranged in a proximal position relative to the extended position such that the distal end of the needle protrudes from a distal end of the needle cover; and
a needle cover biasing member configured to bias the needle cover axially in a distal direction towards the extended position; and
wherein the piston is configured to be coupled to the needle cover such that an axial movement of the needle cover relative to the main body causes an axial movement of the piston relative to the housing, and
wherein the method comprises:
arranging the piston of the hold assistance device in the activated position inside the chamber;
axially moving the needle cover relative to the main body from the extended position to the retracted position; and
unsealing an inlet to the chamber to permit air to flow into the chamber, such that a magnitude of the vacuum force is reduced, thus permitting the piston to move from the activated position to a position proximate to the distal end of the chamber, and such that the needle cover correspondingly moves from the retracted position towards the extended position.

18. The method of claim 17, wherein axially moving the needle cover relative to the main body from the extended position to the retracted position comprises: causing the piston to be moved into the activated position, such that when the needle cover is in the retracted position, the piston is in the activated position, and such that when the needle cover is in the extended position, the piston is not in the activated position.

* * * * *